4 Sheets—Sheet 1.

FROST & MONROE.

Mode of Separating Flour from Bran.

No. 1,280. Reissued Feb. 25, 1862.

N. PETERS, Photo-Lithographer, Washington, D. C.

4 Sheets—Sheet 2.

FROST & MONROE.

Mode of Separating Flour from Bran.

No. 1,280. Reissued Feb. 25, 1862.

N. PETERS, Photo-Lithographer, Washington, D. C.

FROST & MONROE.

Mode of Separating Flour from Bran.

No. 1,280. Reissued Feb. 25, 1862.

N. PETERS, Photo-Lithographer, Washington, D. C.

4 Sheets—Sheet 4.

FROST & MONROE.

Mode of Separating Flour from Bran.

No. 1,280.

Reissued Feb. 25, 1862.

N. PETERS. Photo-Lithographer. Washington, D. C.

UNITED STATES PATENT OFFICE.

ALEXANDER SWIFT, OF CINCINNATI, OHIO, ASSIGNEE, BY MESNE ASSIGNMENTS, OF ISSACHAR FROST AND JAMES MONROE.

IMPROVEMENT IN MODE OF SEPARATING FLOUR FROM BRAN.

Specification forming part of Letters Patent No. 6,148, dated February 27, 1849; Reissue No. 302 dated March 13, 1855; Reissue No. 555, dated May 11, 1858; Reissue No. 1,280, dated February 25, 1862.

*To all whom it may concern:*

Be it known that ISSACHAR FROST and JAMES MONROE, of Albion, in the county of Calhoun, in the State of Michigan, did invent new and useful Improvements in the Machine for Separating Flour from Bran, and for which Letters Patent of the United States were granted unto them, bearing date February 27, 1849, which Letters Patent were surrendered on account of a defective specification, and thereupon new Letters Patent were granted to them, bearing date the 13th day of March, 1855, for the same invention for the residue of the period then unexpired for which the original Letters Patent were granted, and which said reissued Letters Patent, bearing date March 13, 1855, were also surrendered on account of a defective specification, and thereupon new Letters Patent were granted, bearing date the 11th day of May, 1858, for the same invention (for the residue of the period then unexpired for which the original Letters Patent were granted) unto HENRY A. BURR, ISRAEL D. CONDIT, DANIEL BARNUM, and JOHN M. CARR, as assignees of the said ISSACHAR FROST and JAMES MONROE, by intermediate assignments duly recorded in the United States Patent Office, of the whole of the said Letters Patent for the United States, and which said last reissued patent, bearing date the 11th day of May, 1858, is believed to be inoperative by reason of an insufficient description and specification; and I do hereby declare that the following is a full, clear, and exact description and specification of the principle or character which distinguishes the said invention from all other things before known, and of the manner of making, constructing, and using the same, reference being had to the accompanying drawings, making part of this specification, in which—

Figure 1:
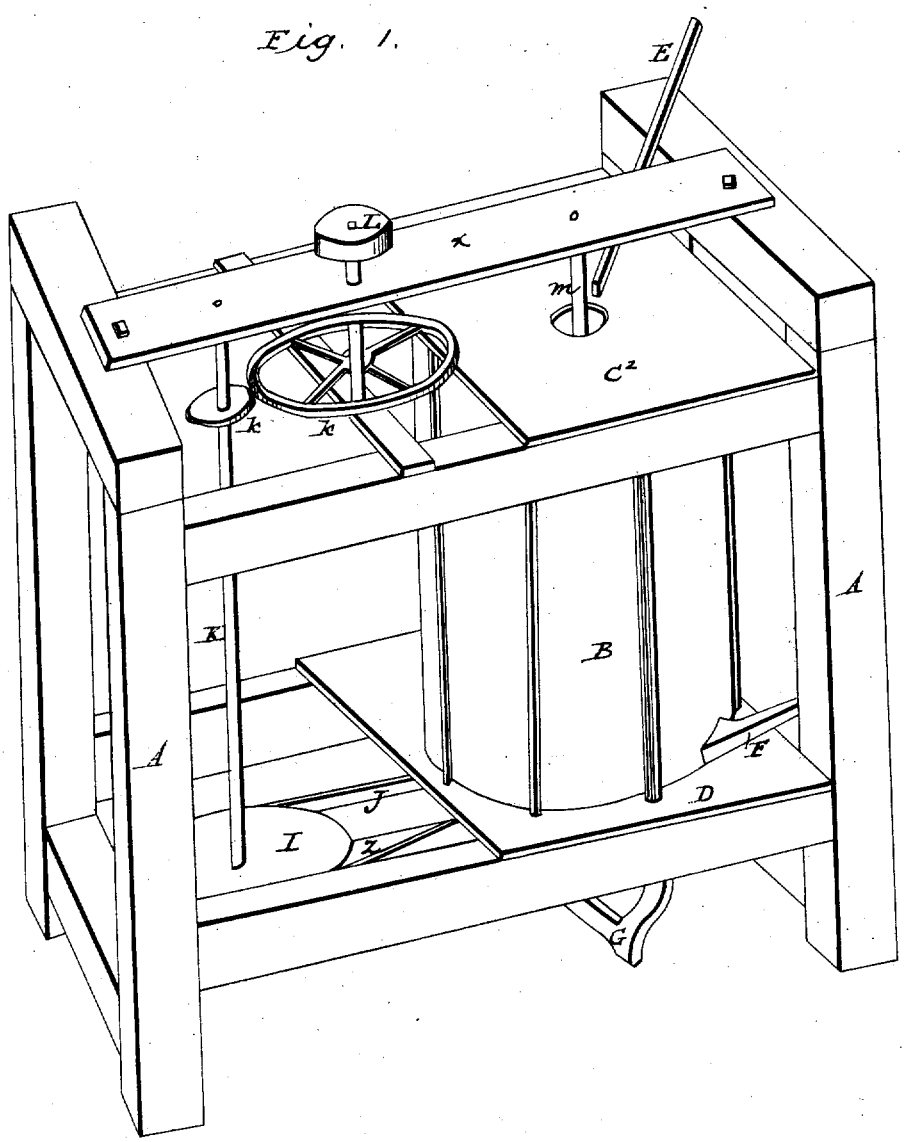
Figure 2:
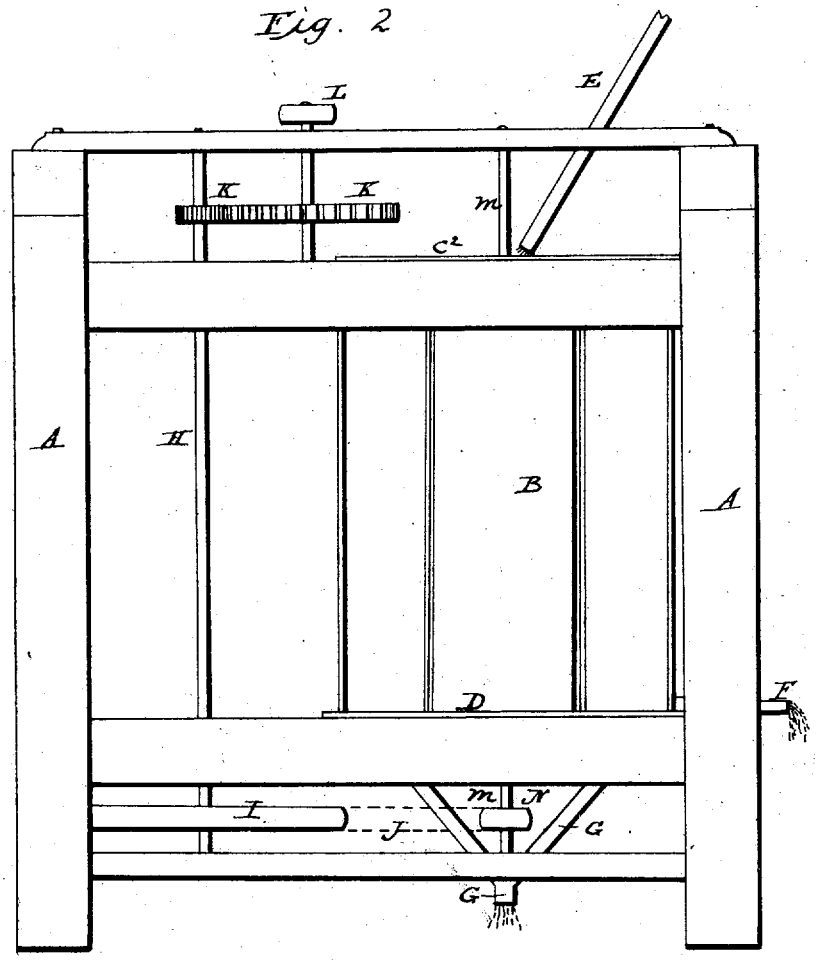
Figure 4:
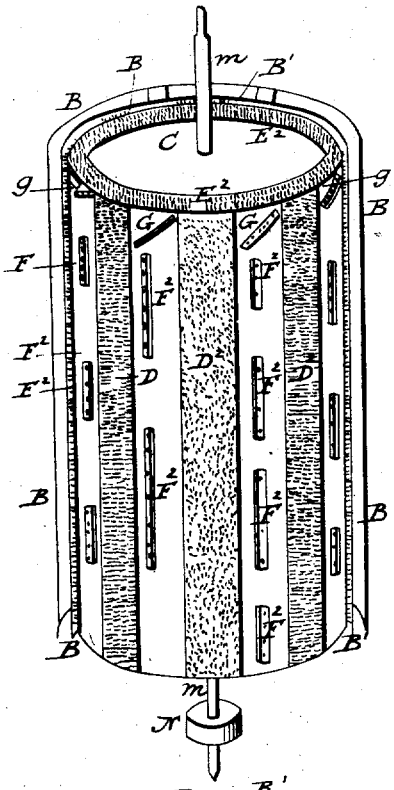
Figure 5:
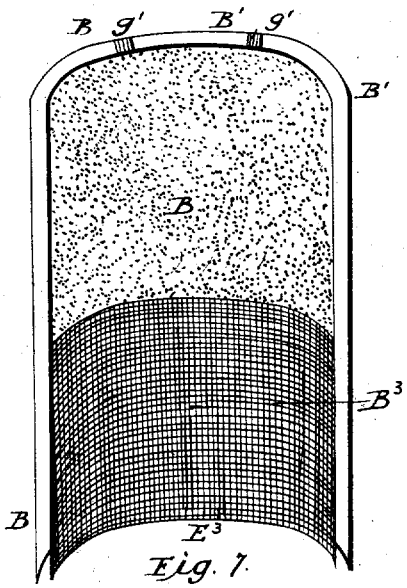
Figure 3:
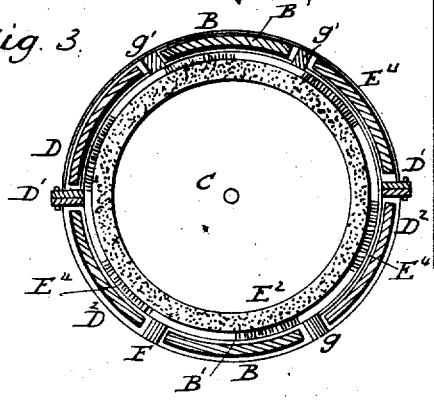
Figure 6:
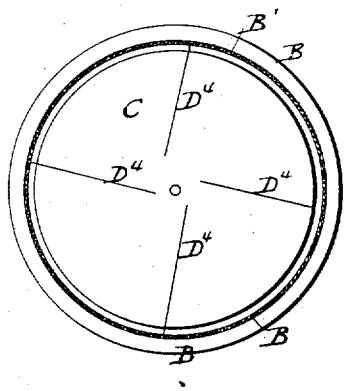

Figure 1 is a perspective view; Fig. 2, an elevation; Fig. 3, a view of the upper end of the cylinder and bolt; Fig. 4, a perspective view of the cylinder with part of the surrounding bolt and case; Fig. 5, a view of the inside of the bolt and part of the surrounding case; Fig. 6, a view of the lower end of the cylinder with the wings or arms, and Fig. 7 a top view of the platform with the other parts of the machine removed.

It is well known that in grinding wheat for the manufacture of flour the kernel is reduced to a fine powder, and the hull is broken up into thin flakes which will not pass through the meshes of a sieve or bolt through which the flour will pass freely. By reason of this difference in size between the particles of flour and of bran they can be separated by the process of sifting, usually termed "bolting," but in all cases prior to this invention this bolting process had been effected in bolting-reels or dressing-cylinders, both ends of which were open and liable to waste from the escape of the material, excepting under a very slow rotation of the bolt; and, besides, much of the fine particles of the flour adheres to the rough surface of the bran in grinding, so that it cannot be separated by the usual process of bolting, and in consequence a large percentage of flour is wasted or passes off as bran; and, again, the ordinary process of bolting flour is effected in bolts placed in a horizontal position, and as the bolt slowly rotates the material falls from side to side, and accumulates on the lower part by the force of gravity, and thus rendering inefficient all but a small portion of the bolting-surface at any one time. Another plan was suggested, with a view to render the whole bolting-surface efficient, by Wm. Ashby, of England, who enrolled a patent on the 24th day of October, 1846, for placing the cylindrical bolt and case with an interior rotating cylinder of brushes, in a vertical position, in which position the force of gravity tends to carry the material directly down through the bolt and out at the open bottom of the bolt without coming sufficiently in contact with the sifting or bolting surface, and to overcome which tendency a rapid rotation was given to the brushes, causing them to act as beaters and fans as well as brushes, the tendency of which beating and blowing action being to scatter and blow the material by centrifugal force out of the open ends of the bolt at top and bottom, causing great waste; and hence this new position of the bolt—in view of the beating and blowing action of the brushes, which is necessary to overcome the tendency of gravitation to carry the material directly through the open bottom of the bolt, and also to loosen and separate the fine particles of flour adhering to the bran, and to force them through the meshes of the bolt, in order to success—demands the introduction of some new mechanical means for distributing the material around the inner periphery of the bolt at its upper end, to render the whole bolting-surface efficient, and at the same time to control and check the descent of the material and prevent its escape from the open ends of the bolt by the centrifugal beating and blowing action of the brushes or other means employed to distribute and loosen the particles of flour from the bran, and to force them through the meshes of the bolt—in all of which respects the said Ashby machine was defective.

The leading object of the said invention of the said FROST and MONROE is to save the flour adhering to the bran after the usual bolting process has been exhausted, and this machine may be therefore properly termed a "bran-duster;" and in view of the defects of the said Ashby machine, with both ends of the vertical bolt open, and the tendency to waste consequent thereon from the centrifugal beating and blowing action of the brushes, and in view also the the necessity of properly distributing, checking, and controlling the material within the bolt, and while the fine particles of flour are being loosened from the bran and forced through the meshes of the bolt, and the bran discharged after all the flour has been seprated. Our invention consists in forming new combinations (for producing the results desired, and for remedying the defects enumerated in prior machines) from essential features or elements, which are hereinafter particularly described, and designated by numbers, as follows: No. 1, a vertical or nearly vertical position of a bolt for separating flour from bran so as to render the whole bolting-surface efficient in the process of bolting flour; No. 2, a case, or its equivalent, surrounding the bolt and forming a chamber or chambers to receive the flour as it is forced through the meshes of the bolt, the said chambers being provided with an aperture or apertures at bottom for the delivery of the flour as fast as the same is collected, and which, if not permitted to escape, would soon accumulate and stop up the meshes of the bolt; No. 3, a rapidly-rotating shaft or cylinder within the bolt, armed with beaters, pins, fans, or any analogous means—whether of rigid or flexible material—which in rotation will generate a cylinder with projections on its periphery that will beat, scour, and loosen the particles of flour which adhere to the bran in grinding while it is descending around the inner surface of the bolt, and by centrifugal action generate an outward current of air, and project the material with air against the inner surface of the bolt, each of which, and both jointly, will act to effect the separation of the flour from the bran, and the discharge of the flour through the meshes of the bolt into the flour-chambers while the bran gradually descends upon the closed-up bottom; No. 4, a distributing head or table rapidly rotating within and near the upper end of the bolt, onto which the material falls when fed into the machine for the purpose of scattering and distributing it, and by centrifugal force impelling it toward and against the inner circumference of the bolt at its top, so as to have it descend just within the periphery of the bolt, that the beating, scouring, and loosening action may take effect when the mechanical action is at its maximum around the entire bolting-surface, that the flour as soon as liberated from the bran may be forced through the meshes by the centrifugal action of an interior scouring-cylinder, thus rendering the whole bolting-surface efficient, which could not be done if the material were not properly distributed around the bolting-surface at the upper end of the bolt; No. 5, a closed-up top to the bolt proper, except an aperture or apertures for the admission or feeding in of the material with air, the said aperture being placed somewhere within the periphery of the bolt, so that the material when introduced may be properly acted upon and distributed around the inner surface of the bolt at its upper end by the centrifugal action of a distributing-head or of a rapidly-rotating scouring cylinder within the bolt, the purpose of the closed-up top being to prevent the material from being thrown out at the top of the bolt in escaping currents of air, induced by the centrifugal action of the distributing-head, or of beaters or fans, whether of rigid or flexible material; No. 6, a closed-up bottom to the bolt proper, except an aperture or apertures near the periphery for the discharge of the bran after the flour has been separated, whether the said bottom be or be not provided specially with an aperture for the admission of air, the purpose of closing up the bottom being the better to prevent the escape of the material in downward currents of air induced by the centrifugal action of beaters or fans within the bolt, and thus the better to check the descent of the material that it may be retained within the bolt a sufficient length of time to loosen and effect the separation of the flour from the bran by the mechanical and centrifugal action of the beaters or fans, or analogous means for forcing the flour through the meshes of the bolt; No. 7, rotating arms or wings moving in close proximity with the upper surface of the platform or closed-up bottom, to act on the bran as it falls on the said bottom, and to carry or sweep it around to the discharge-apertures, where it is delivered, and which, if not so operated upon, would pile up on the closed-up bottom and soon choke the operation of the machine.

The frame A A should be made about two and a half feet wide by four feet long inside, and about four feet (more or less) high, and of timber four inches square.

B represents a cylindrical case, made of sheet-iron or other material, supported on the inside by the outside edge of the annular ribs that support the cloth on their inside, made some two or three inches wide and from half an inch to an inch thick, said case to be twenty-two inches in diameter and thirty-two inches high, inclosed in which, and supported by and attached to the ribs on the inside of the case, is a cylindrical bolt, made of wire bolting-cloth $B^3$ and perforated sheet-iron B′, eighteen inches in diameter and thirty-two inches high; also inclosed within said case and within the bolt is a revolving cylinder, C, sixteen inches in diameter and twenty-nine inches long, and attached to and driven by the shaft M.

At D is shown the platform on which rests the case and bolts, and through the center of which is to be an opening, $D^5$, similar to that in the top, $C^2$, through which may pass the shaft M also, for the free admission of air. (More fully shown at Fig. 7.)

At E is shown a conductor to convey the ground material through the top to the inner portion of the cylinder for bolting or cleaning.

At F is shown a conductor, through which is discharged the bran after cleaning. At G are shown conductors to convey off the flour, the upper ends of which are connected with the bottom of the bolt or platform or space E, or openings in the bottom or platform D, between the bolt and case. At H, I, J, K, and L, respectively, are shown a shaft, pulley, band, pinion, spur-wheel, and driving-pulley, used to drive the cylinder the required velocity, the band J passing from the pulley I and around the pulley N, attached to the lower end of shaft M M, as shown at Fig. 2.

Fig. 2, at A A, represents a side view of the frame; B, the case surrounding the bolt, cylinder, &c.; $C^2$, top of case; D, platform or horizontal bottom; E, conductor to feed the machine; F, conductor for the bran after cleaning; G G, flour-conductor; K, speed-shaft; I, large pulley; J, band; K K, pinion and spur-wheel; L, driving pulley; M M, cylinder-shaft; N, pulley.

Fig. 3 shows the top of the cylinder, bolt, and case, with the top C, Fig. 1, removed. B shows the edge of case; B′, the edge of bolt; C, the upper end of cylinder; D′ D′, Fig. 7, an extension of ribs upon the outside of the case to admit of bolts to fasten the case, which is made in section together.

Fig. 4 shows in perspective the cylinder, made of wood and iron, and parts of the one-half of the case and bolt; B B, the case; B′ B′ B′, the bolt; C, the cylinder. At $D^2$ $D^2$ $D^2$, on the cylinder, is represented sections or strips of teeth projecting outward about three-fourths of an inch from the surface. The teeth may be made of brads or small nails with the heads removed and driven in, or may be made by driving large tacks through strips of leather at intervals of one-fourth of an inch, (more or less,) and nailing the strips of leather on the cylinder with the points of the tacks projecting. The sections of teeth should cover about one-half of the surface of the cylinder. $E^2$ is a similar strip to those at $D^2$, constructed in the same manner and nailed on the upper end and around the outer edge with the teeth projecting upward. It may be from two to four inches wide, which is intended for distributing the material more perfectly and evenly around the bolting-surface. At $F^2$ $F^2$, and upon the cylinder, is shown strips or wings of sheet-iron or other material fastened to the cylinder, with one edge or both turned at right angles with the surface of the cylinder, so as to form wings or fans. They may be put at regular or irregular intervals, so as to balance the cylinder. The wings, as at G, may be put on spirally. The wings may project about as far as the ends of the teeth.

At Fig. 5 is shown sections of the bolt and case; B B, edges of the case; B′ B′, the upper part of the bolt, made of sheet-iron, thickly perforated with small holes by indentation by a sharp-pointed punch, and put on with the rough side next to the cylinder, so as the more effectually to scour the bran; $B^3$, the lower portion of the bolt, made of fine-wire bolting-cloth. At $E^3$ is shown openings leading into conductor F, Figs. 2, 5, and 7. The bolt may be made in the manner described, or the entire bolt may be made of either substance described above, or any other like substance which will cause the same results.

At Fig. 6 is shown the lower end of the cylinder, case, and bolt; B, case; B′, the bolt; C, the cylinder. $D^4$ $D^4$ $D^4$ $D^4$ are wings projecting downward from the ends of the cylinder about one and a half or three-fourths inches in a space of two inches between cylinder and horizontal bottom, for the purpose of collecting the bran after the flour has been separated from it and it has fallen on the bottom, and carry it around to the discharge, and thus prevent the machine from being choked up by the accumulation of the said bran. The balance of the space is occupied with a cleat on the back edge of the bran-spout to arrest the bran brought round by the wings immediately to the bran-exit. The arrangement of the wings is such as to induce a supply of air at $D^5$ to counteract the too rapid fall of the material by the air admitted at the top.

Figure 7:
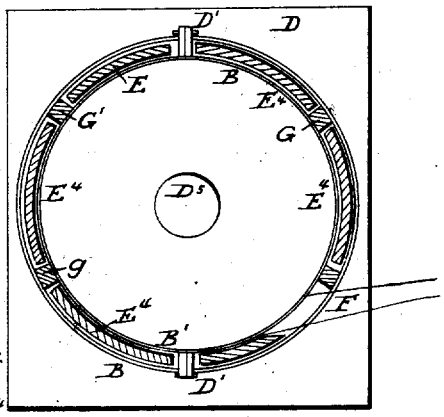

D, Fig. 7, shows the platform or horizonal bottom at right angles to the axis of the bolt; $D^5$, a hole for the admission of air, and through which the shaft of the cylinder is to pass. $E^4$ $E^4$ are the segmental spaces or openings in the bottom D between the bolt and case. These spaces may be segmental mortices cut through the platform for the escape of the flour, as shown. F is the conductor for the bran, (shown in connection with the bottom, or wholly through the bottom.)

The above-described machine, when put in motion, (about eight hundred revolutions per minute,) will scour and separate from bran, shorts, &c., all the remaining particles of flour which may adhere after the first bolting, or may be used as a first bolter by spouting the material direct from the stones into it, which, in that case, will bolt and fan the flour cool the instant it is ground, preventing the condensation of the atmosphere upon the heated material occasioned by the rapid grinding we do of late years. After the machine is put in motion the material should be fed in through the conductor E, Fig. 1; thence, falling upon the distributing head or table, is carried by the centrifugal action over the end and down the sides between the cylinder and bolt, when it is distributed, beaten, and scoured so as to remove all remains of flour, the bran continuing its course (not being permitted to escape through the fine bolting-cloth) downward, where it is carried round by rotating wings or arms to the conductor or bran-spout F, Figs. 7, 2, and 1, while the flour passes through the bolt into the annular spaces between the bolt and case; thence passes downward into the conductor G, Fig. 1; thence into the flour-chest or the cooler of the mill. The perforated portion of the bolt at B may be covered on the convex surface with bolting-cloth. The vertical parallel strips of iron H on the cylinder C may be made rough, by punching, for the scouring of the bran. If desired, knockers may be applied, as in the ordinary bolt, to jar the machine and prevent choking or stopping up the meshes; but this will only be required when the speed of the cylinder is not sufficient and the flour is damp and liable to adhere; but as the use of knockers is well-known and have been variously applied to bolting-machines, it is not deemed necessary to give a detailed description of their application.

We do not claim as our invention the vertical position of the bolt, or the surrounding case and flour-chambers, or a rapidly-rotating cylinder within the bolt, whether the said cylinder be armed with beaters, pins, fans, or brushes, either separately, as devices, or in combination, as in the Ashby machine, or otherwise, except as they are severally combined as essential features with other essential and different essential features, and forming new combinations, as hereinafter specially set forth and claimed as the invention.

What is claimed as the invention, and desired to be secured by Letters Patent of the United States, is as follows, namely:

1. The combination of the essential features hereinbefore severally described, and severally numbered 1, 2, 3, and 4, or their equivalents, substantially as they are described, and for the purposes specified in the several numbers.

2. The combination of the essential features hereinbefore severally described, and severally numbered 1, 2, and 5, or their equivalents, substantially as they are described, the purpose of the combination being substantially as set forth in number 5.

3. The combination of the essential features hereinbefore severally described, and severally numbered 1, 2, and 6, or their equivalents substantially as they are described, the purpose of the combination being substantially as set forth in number 6.

4. The combination of the essential features hereinbefore severally described, and severally numbered 1, 2, 6, and 7, or their equivalents, substantially as they are described, the purpose of the combination being substantially as set forth.

5. The combination of the essential features hereinbefore severally described, and severally numbered 1, 2, 4, 5, 6, and 7, or their equivalents, substantially as specified, the purpose of the combination being substantially as severally set forth.

ALEX. SWIFT.

Witnesses:
SAML. S. FISHER,
JOSEPH KINSEY.